June 4, 1929.　　　C. W. WALKER　　　1,715,483
BEARING FOR PASTEURIZERS
Filed April 5, 1927
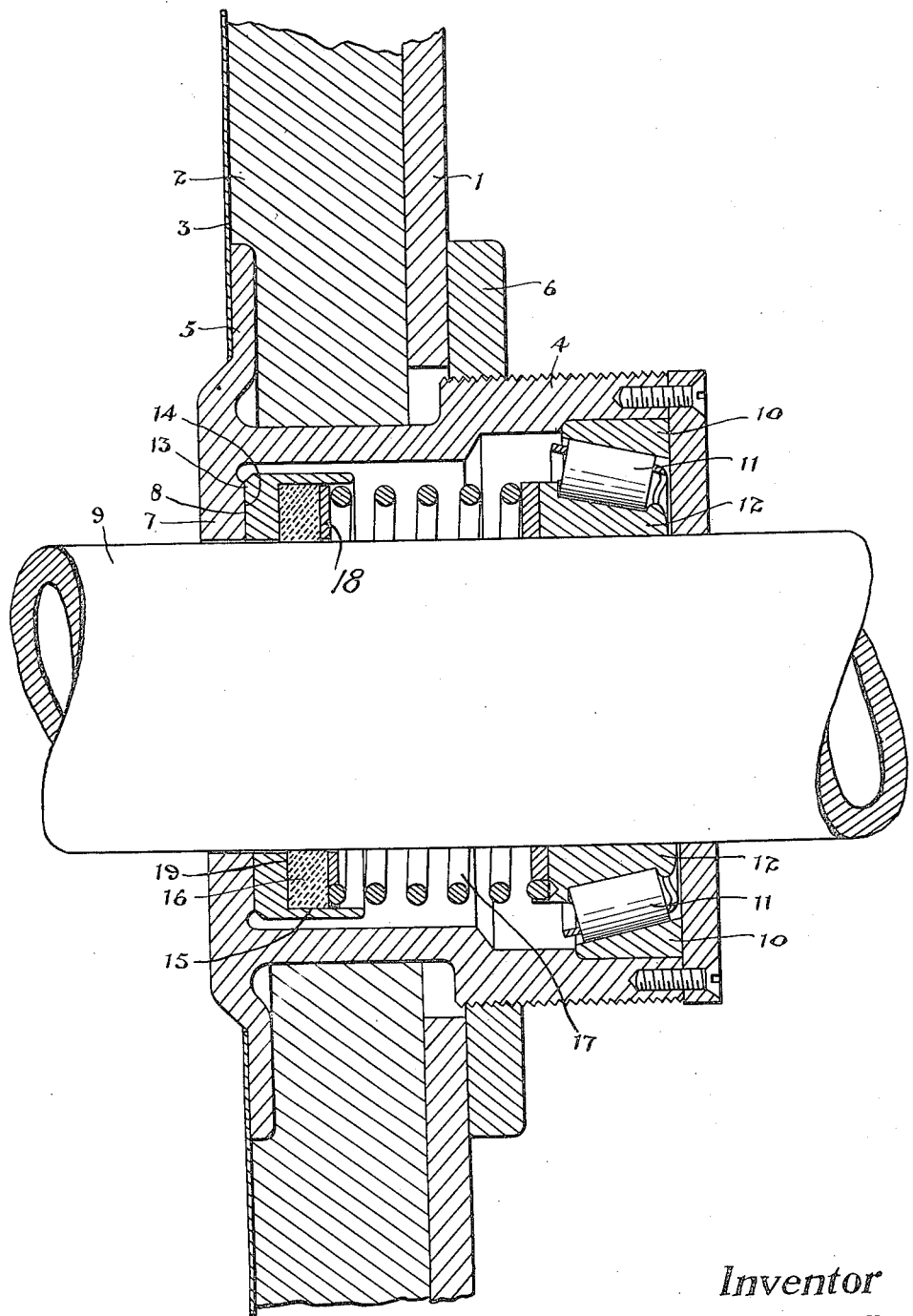
Inventor
Charles W. Walker Patented June 4, 1929.

1,715,483

UNITED STATES PATENT OFFICE.

CHARLES W. WALKER, OF TORONTO, ONTARIO, CANADA, ASSIGNOR TO WALKER-WALLACE LIMITED, OF TORONTO, CANADA.

BEARING FOR PASTEURIZERS.

Application filed April 5, 1927. Serial No. 181,203.

The principal objects of the invention are, to eliminate the unsanitary conditions found in the packing of the shafts of pasteurizers and homogenizers, and to provide a form of packing which will retain the shaft orifice in the receptacle, fluid tight and will not permit the accumulation of milk in the packing or around the bearing.

A further object is to devise a simple form of bearing structure which may be very readily applied to the receptacle.

The principal feature of the invention consists in the novel construction and arrangement of parts, whereby a ground seated ring longitudinally adjustable upon the shaft and engaging same in constant fluid tight contact engages a ground seat of a stationary ring encircling the shaft, and whereby the shaft is longitudinally adjustable in the bearing support.

The drawing is a longitudinal mid-sectional view of my improved shaft bearing support.

In the operation of pasteurizers the hollow worm shaft is subjected to a very considerable variation of temperatures owing to the passage of hot water therethrough to effect the raising of the temperature in the milk in the tank or receptacle to the pasteurizing heat and following which cold water is circulated therethrough. Such changes of temperature conditions cause an expansion and contraction of the shaft necessarily results in its longitudinal movement in the bearings.

It has been the common practice to support the shaft in a bronze or babbitt bearing and to pack the shaft by means of a stuffing box.

In the construction herein shown the steel body 1 of the tank is lined with an insulating lining 2 and an inner copper lining 3.

A bronze sleeve 4 extends through an opening in the body and linings and is provided with a laterally outwardly extending flange 5 to which the copper lining 3 is soldered.

The outer portion of the sleeve 4 is threaded and a nut 6 is threaded thereon and engages the outer steel body and is firmly secured in place thereon by being suitably brazed.

The inner end of the sleeve 4 is formed with an inwardly extending flange 7 which is provided with a flat ground seat 8 facing outwardly into the sleeve.

The inner perimeter of the flange 7 is a snug sliding fit on the hollow shaft 9.

A tapered bearing 10 is mounted in the outer end of the sleeve and supports the tapered roller bearings 11 which carry a bearing ring 12 which slidably embraces the shaft 9.

Enclosed within the sleeve 4 is a ring 13 of Monel metal or other suitable noncorrosive metal having its inner flat face 14 ground to fit against the ground seat 8 of the flange 7 of the sleeve.

The ring is a sliding fit on the shaft 9 and is provided with a flange 15 extending toward the bearing end of the sleeve.

Housed within the flange 15 is a ring 16 of rubber or other suitable elastic material impervious to and unaffected by milk. This ring 16 snugly embraces the shaft in fluid tight contact and it fits snugly within the ring 13 and is held in a state of compression by the pressure of a coil compression spring 17 which rests against the bearing ring 12 of the shaft and a washer 18 which abuts the ring 16.

The spring 17 maintains a constant pressure against the resilient ring 16 so that said ring is held in constant fluid tight contact with the shaft and also in constant fluid tight contact with the face 19 of the ring 13 so that leakage of milk from the tank into the bearing is impossible.

The resilience of the ring 16 while maintaining a constant fluid tight contact with the shaft allows the shaft to move longitudinally quite freely in its expanding and contracting action and as the ring 16, together with the ring 13 and the bearing 12 all rotate with the shaft, there is practically no wear on the rubber ring.

The use of the spring 17 while maintaining a fluid tight joint at the inner end of the bearing also functions in holding the bearing ring 12 in constant and uniform contact with the roller bearings 11.

The structure described is extremely simple and it will be readily seen that there can be no leakage of milk into the sleeve and there is no place for milk to be pocketed which will not be completely removed in the washing of the tank.

The ring 16 is impervious to moisture and consequently the sanitary condition of the bearing will be of the most excellent character.

The bearing is simple of structure, easy to manufacture and the cost of construction is remarkably low.

What I claim as my invention is:—

1. In a bearing for pasteurizers, the combination with the tank and the hollow shaft, of a bearing sleeve secured in the tank and encircling the shaft, a bearing mounted in one end of the sleeve slidably encircling and supporting the shaft, annular means slidably encircling the shaft and having a sealing portion engaging the other end of the sleeve in sealing contact and a sealing portion engaging the shaft in sealing contact, and a compression spring encircling the shaft and exerting an axial pressure on the bearing and on said annular means to maintain the two in constant relatively spaced relation within the sleeve unaffected by the longitudinal movements of said hollow shaft.

2. In a bearing for pasteurizers, the combination with the tank and the hollow shaft, of a bearing sleeve secured in the tank wall having an inturned flange presenting a flat bearing face within the sleeve, a ring encircling the shaft and engaging said flat bearing face in sealing contact and having a resilient ring mounted therein engaging the shaft in sliding sealing contact, a bearing slidably mounted on and supporting said shaft and arranged within the sleeve in spaced relation to said ring members, and a compression spring arranged between and engaging said ring members and bearing and exerting an axial pressure thereon to maintain the rings and bearing in constant relatively spaced relation within the sleeve unaffected by the longitudinal displacements of the hollow shaft.

3. In a bearing for pasteurizers, the combination with the tank and the hollow shaft, of a bearing sleeve secured in the tank and surrounding the shaft and having an inwardly extending flange provided with a flat bearing face, a ring slidably encircling the shaft and having a flat face engaging the flat face of said sleeve in fluid tight contact, said ring having a lateral flange, a ring of resilient material arranged within said flange and engaging the perimeter of the shaft in a sliding fluid tight contact, a bearing slidably encircling and supporting said shaft and arranged within said sleeve, and a compression spring encircling said shaft and arranged between and exerting an axial pressure on the bearing and on said resilient ring to maintain the two in constant relatively spaced relation unaffected by the longitudinal movements of said hollow shaft.

4. In a bearing for pasteurizers, the combination with the tank and the hollow shaft, of a bearing sleeve secured in the tank and surrounding the shaft, said sleeve having an inwardly extending flange provided with a flat bearing face, a fixed bearing ring secured in the outer end of the sleeve, a bearing ring slidably encircling the shaft, roller bearings between said bearing rings, a ring loosely encircling the shaft and having an end face engaging the flat bearing face of said sleeve in a fluid tight contact, said ring having an annular flange, a resilient ring enclosed by the flange of the latter ring and engaging the shaft and said ring in fluid tight contact, and a coil compression spring arranged between said resilient ring and the slidable bearing ring and exerting a pressure against the slidable bearing ring and said resilient ring.

CHARLES W. WALKER.